United States Patent
Furlani et al.

(10) Patent No.: US 6,490,609 B1
(45) Date of Patent: Dec. 3, 2002

(54) METHOD, APPARATUS AND COMPUTER PROGRAM PRODUCT FOR INVOKING A THREAD-UNAWARE ROUTINE THAT USES AN OPERATION-DEPENDENT TEMPORARY DATA STRUCTURE

(75) Inventors: John L. Furlani; Michael D. O'Connor, both of Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/004,969

(22) Filed: Jan. 9, 1998

(51) Int. Cl.[7] .............................................. G06F 17/00
(52) U.S. Cl. ...................................... 709/100; 709/107
(58) Field of Search ................................ 709/100–108, 709/310–400; 711/100–173

(56) References Cited

U.S. PATENT DOCUMENTS

| | | | | |
|---|---|---|---|---|
| 5,345,588 A | * | 9/1994 | Greenwood et al. ........ | 709/107 |
| 5,432,933 A | * | 7/1995 | Janicek ....................... | 709/100 |
| 5,481,706 A | * | 1/1996 | Peek ........................... | 710/200 |
| 5,694,603 A | * | 12/1997 | Reiffin ........................ | 709/107 |
| 5,694,604 A | * | 12/1997 | Reiffin ........................ | 709/107 |
| 5,778,411 A | * | 7/1998 | DeMoss et al. .............. | 710/68 |
| 5,784,613 A | * | 7/1998 | Tamirisa ..................... | 709/100 |
| 5,862,376 A | * | 1/1999 | Steele et al. ................ | 709/102 |
| 6,058,460 A | * | 5/2000 | Nakhimovsky ............. | 711/153 |
| 6,085,215 A | * | 7/2000 | Ramakrishnan et al. .... | 709/102 |
| 6,182,108 B1 | * | 1/2001 | Williams et al. ............ | 709/102 |
| 6,247,105 B1 | * | 6/2001 | Goldstein et al. ........... | 711/170 |

OTHER PUBLICATIONS

Butenhof, David R., *Programming with POSIX Threads*. Massachusetts: Addison–Wesley Longman, Inc. 35–95, 214–269 (1997).
Powell, M.L. et al., "SunOS Multi–thread Architecture," *USENIX*. 65–79 (1991).
Van Der Linden, P., "Java Laguage Specifics," *Not Just Java*. California: Sun Microsystems Press. 138–149 (1997).

* cited by examiner

*Primary Examiner*—St. John Courtenay, III
*Assistant Examiner*—Van H. Nguyen
(74) *Attorney, Agent, or Firm*—J. D. Harriman, II, Esq.; Coudert Brothers LLP

(57) ABSTRACT

Apparatus, methods and computer program products are disclosed that allows a thread-unaware routine that accesses an operation-dependent temporary data structure to be shared by multiple threads in a multi-threaded computing environment. The programmer for an operation provides three routines—a pre-processing routine, a operation routine, and a post-processing routine. The pre-processing routine allocates the operation-dependent temporary data structure. The operation routine accesses the operation-dependent temporary data structure to perform its operation for each thread that invokes the operation routine. The post-processing routine deallocates the operation-dependent temporary data structure when it is no longer needed.

18 Claims, 5 Drawing Sheets

METHOD, APPARATUS AND COMPUTER PROGRAM PRODUCT FOR INVOKING A THREAD-UNAWARE ROUTINE THAT USES AN OPERATION-DEPENDENT TEMPORARY DATA STRUCTURE

BACKGROUND OF THE INVENTION

1. Field of the Invention

This invention relates to the field of multithreaded processing techniques. Specifically, this invention is a method, apparatus, and computer program product for the execution of a thread-unaware routine that implements an operation and accesses an operation-dependent temporary data structure in a multithreaded computing environment.

BACKGROUND

Many computing environments are multi-threaded. Such environments simplify the development of programs that have multiple simultaneous independent sequences of control in both single- and multi-processor systems. One difficulty with developing such programs is that multiple threads may simultaneously execute a routine that uses an operation-dependent temporary data structure to perform an operation. The prior art routine coordinates the creation of the operation-dependent temporary data structure among the threads that invoke the routine. The prior art routine also monitors and controls the execution of the threads that access to the temporary data structure. This explicit thread control within the routine increases the complexity of the routine, limits the number of simultaneous threads that invoke the routine, and increases the routine's overhead.

One use of multiple threads, is to partition a problem domain and then to assign each partition to a thread for processing. For example, this technique can be used by an image processing program to partition the image data of an image (each partition being termed a tile) and operating on each tile by its assigned thread. In this example, each thread invokes a routine that uses the same operation-dependent temporary data structure to process its assigned tile. The result of processing all the tiles is the same as if the complete image data was processed by a single thread except that the multiple threads allow concurrent processing. An example of such an operation in the image processing problem domain is graphically represented as shown in FIG. 1. One problem in the prior art is that as each thread invokes the routine, the routine must determine which thread has invoked it and if the operation-dependent temporary data structure has already been allocated for that thread.

FIG. 1 illustrates a 'LUT image processing operation and data' graph, indicated by general reference character 100. The 'LUT image processing operation and data' graph 100 is a directed acyclic graph (DAG) representing an operation performed on a source image 101 and resulting in a destination image 103. In this example the operation is a 'LUT image processing operation' 105 that uses a 'lookup table' 107. The 'lookup table' 107 is an operation-dependent temporary data structure. The 'lookup table' 107 is temporary in that the 'LUT image processing operation' 105 creates the table in memory (from other data accessible to the operation) to optimize performance of the LUT operation. Once the LUT operation is completed, the 'lookup table' 107 can be deleted. The 'LUT image processing operation' 105 can be thread-aware to allow concurrent processing of tiles in the source image 101. To perform the same operation on each tile, each execution accesses the same operation-dependent temporary data structure. The 'LUT image processing operation' 105 is thread aware in that it detects its first invocation by a thread and creates the operation-dependent temporary data structure. The 'LUT image processing operation' 105 also detects subsequent thread invocations and uses the previously created operation-dependent temporary data structure. If the 'LUT image processing operation' 105 routine is also called to process another image while the source image 101 is being processed it generally must create another operation-dependent temporary data structure for that image. Thus, to allow multiple images to be processed, the 'LUT image processing operation' 105 must also have the capability to associate the appropriate operation-dependent temporary data structure with each thread. Thus, during execution of the routine by each thread, the routine must account for, and manipulate, the threads used to parallelize its execution; and associate the operation-dependent temporary data structure with the thread. These overheads reduce the routine's performance. One skilled in the art will understand that temporary data structures can also be used by other graphical or non-graphical operations.

Another drawback of using thread-aware routines which access operation-dependent temporary data structures is that including the thread-aware programmed logic complicates the routine's programming. For example, detecting when all threads have completed processing (so as to be able to determine when to delete the operation-dependent temporary data structure) increases the routine's complexity. In addition, the number of threads supported by the routine limits the number of threads available to parallelize execution of the operation.

For these reasons, it would be advantageous to provide a mechanism that enables a thread-unaware routine (that accesses an operation-dependent temporary data structure to perform its operation) to be executed by a plurality of threads.

SUMMARY OF THE INVENTION

The present invention provides an apparatus, method and computer program product for invoking a thread-unaware routine in a multi-threaded environment. A thread-unaware routine is a routine that does not contain programmed logic to manage or manipulate threads in preparation for an access to operation-dependent temporary data structure used by the routine. One aspect of the invention includes a computer controlled method for invoking an operation routine from within a multi-threaded computing environment. The operation routine implements an operation and accesses an operation-dependent temporary data structure. The operation routine is executed by a plurality of threads. The computer controlled method invokes a pre-process routine that prepares the operation-dependent temporary data structure. The computer controlled method also invokes the operation routine by one or more of the plurality of threads to perform the operation using the operation-dependent temporary data structure. The operation routine is thread-unaware.

Another aspect of the invention includes an apparatus for invoking an operation routine from within a multi-threaded computing environment. The apparatus has a central processing unit (CPU) and a memory coupled to the CPU. The operation routine implements an operation, accesses an operation-dependent temporary data structure and is executed by a plurality of threads. The apparatus includes a pre-process invocation mechanism that is configured to invoke a pre-process routine. The pre-process routine prepares the operation-dependent temporary data structure for access by the operation routine. The apparatus also includes an operation invocation mechanism that is configured to invoke the operation routine by one or more of the plurality of threads to perform the operation using the operation-dependent temporary data structure allocated by the pre-process invocation mechanism. The operation routine is thread-unaware.

Yet a further aspect of the invention is a computer program product that includes computer readable code, embedded in a computer usable storage medium, for causing a computer to invoke an operation routine. The operation routine implements an operation and accesses an operation-dependent temporary data structure, from within a multi-threaded computing environment. The operation routine is executed by a plurality of threads. When executed on a computer, the computer readable code causes a computer to effect a pre-process invocation mechanism and an operation invocation mechanism. Each of these mechanisms have the same functions as the corresponding mechanisms for the previously described apparatus.

These and other features of the invention will become apparent when the following detailed description is read in combination with the accompanying figures.

DESCRIPTION OF THE PREFERRED EMBODIMENTS

Notations and Nomenclature

Figure 1:
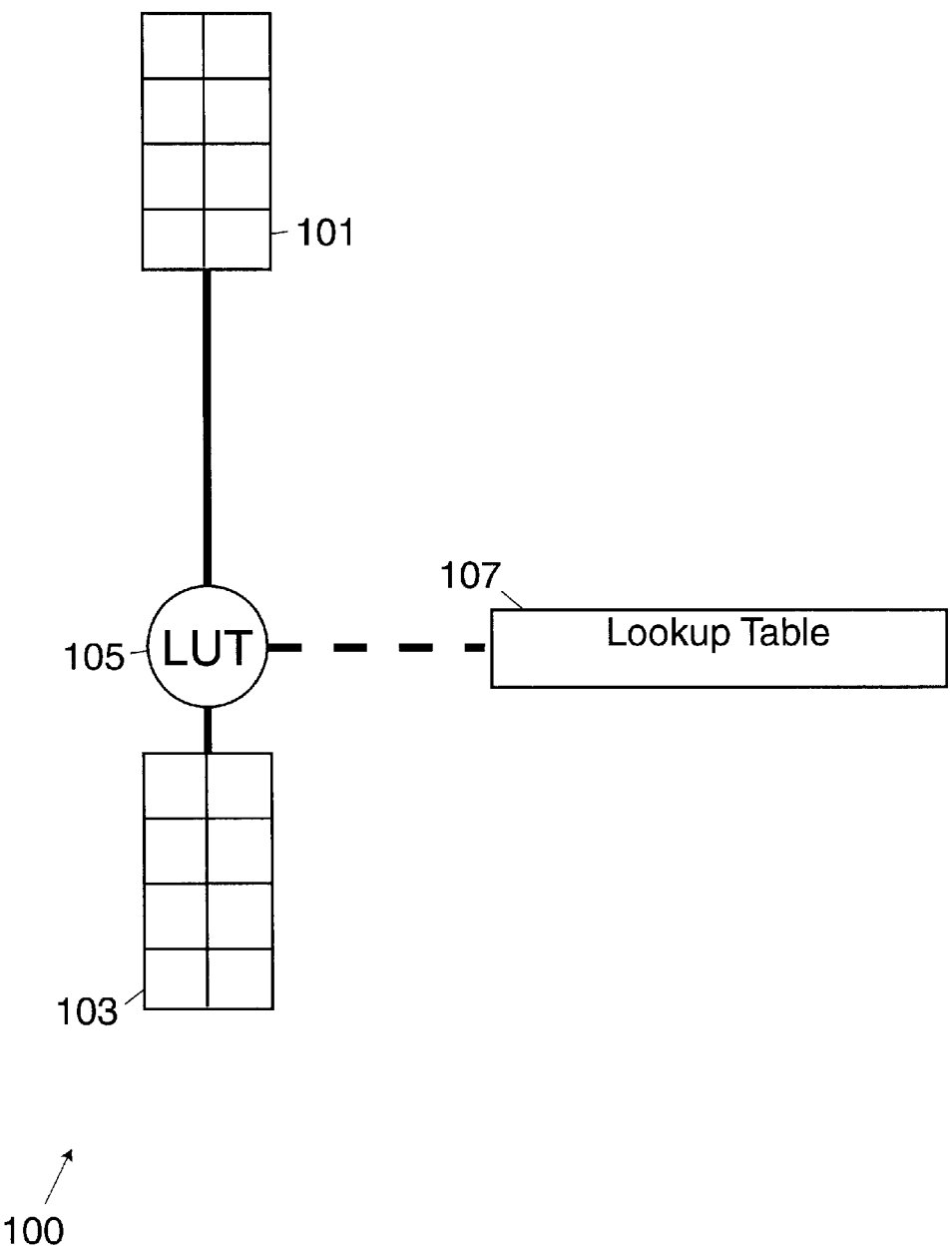
FIG. 1 illustrates a DAG of an operation on a source image resulting in a destination image as known in the art.

The following 'notations and nomenclature' are provided to assist in the understanding of the present invention and the preferred embodiments thereof.

Destination image—A destination image is the image created by an image processing operation. Often the image processing operation performs a transformation or operation on a source image to generate the destination image. Some image processing operation may directly generate a destination image without access to a source image. A destination image contains image data.

Image—An image is the visual representation of image data that is presented to a user.

Image data—The image date is an array of pixels that represents an image.

Image tile—An image tile is a partition of an image's image data.

Lookup table (LUT)—A LUT is a data structure which that can be indexed into using a value to obtain a corresponding value from the table.

Lookup table (LUT) operation—A LUT operation is an image processing operation that uses a pixel value in a source image to locate the corresponding pixel value in a lookup table. This corresponding pixel value is generally stored in the destination image.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Routine—A routine is a procedure that can be invoked to perform an operation. A routine is generally a function, programmed-procedure, method or equivalent construct.

Source image—A source image is an image on which an image processing operation operates. An image processing operation transforms a source image into a destination image. A source image contains image data.

Thread—A thread-of-execution is a sequence of control within a programmed-process. A traditional single-threaded programmed-process follows a single sequence of control while executing. A multithreaded programmed-process has several sequences of control, and is capable of several independent actions.

Thread-unaware—A thread-unaware routine is a routine that does not contain programmed logic to access, manage or manipulate threads in preparation for an access of an operation-dependent temporary data structure used by the routine. A thread-unaware routine may however utilize data access locks (such as a mutex) to assure exclusive write-access to the operation-dependent temporary data structure.

Overview

The manipulations performed by a computer in executing programmed instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

More specifically, the invention relates to the processing of a problem domain by a routine that accesses an operation-dependent temporary data structure. When a processing operation is to be performed, a pre-process routine is called that prepares the operation-dependent temporary data structure. For example, the pre-process routine may initialize the operation-dependent temporary data structure to optimize a performance aspect of the processing operation. Using one aspect of the invention a process creates a plurality of threads (to parallelize execution of the routine that effectuates the processing operation) and partitions the problem domain into one or more sub-domains. The process then iterates the threads; each thread is started and within each thread a routine invoked to perform the processing operation. The routine accesses the operation-dependent temporary data structure as necessary to complete the processing operation and possibly return a result. The process then destroys the plurality of threads. If the operation is such that the results from each sub-domain accumulate over the entire problem domain, the process consolidates the results. The process then deallocates the operation-dependent temporary data structure. In accordance with a preferred embodiment, a post-process routine may be invoked to consolidate processing results and deallocate the operation-dependent temporary data structure. Although the following description is targeted toward using the inventive techniques in an image processing context, one skilled in the art will understand that these techniques are not limited to the image processing context and also may be applied in many other multi-threaded contexts.

Operating Environment

Figure 2:
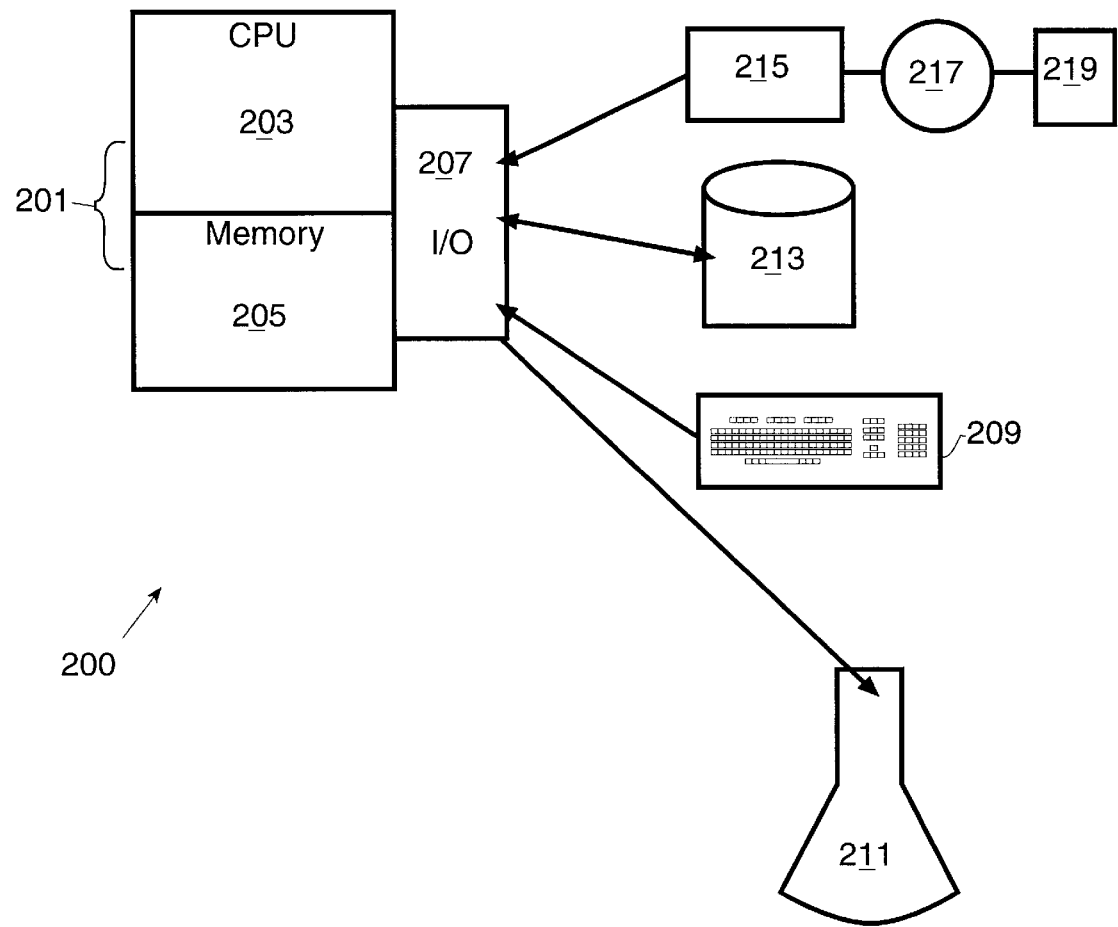
FIG. 2 illustrates a computer system capable of using the invention in accordance with a preferred embodiment.

FIG. 2 shows some of the elements of a computer, as indicated by general reference character 200, configured to support the invention. Shown are a processor 201, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217, and the disk storage unit 213 comprise a filestorage mechanism. One skilled in the art will understand that the CD-ROM drive unit 215 can be replaced by a floppy disk, magnetic tape unit or similar device that accepts a removable media that can contain the program and data 219. Such a computer system is capable of executing programmed-processes that embody the invention. The descriptions of the figures that follow will assist one skilled in the art in practicing the invention in such a computer system.

One aspect of the invention is a technique for performing an operation from multiple threads. This is accomplished by separating the thread management related aspects from the operational aspects of the operation. That is, the thread management related aspects are removed from the routine that implements the operation and placed within pre- and post-processing routines. Thus, the routine that effectuates the operation (the operation routine) is thread-unaware. Generally, the programmer of the procedure used to perform an operation creates these three routines. The first routine is a pre-processing routine that allocates and initializes the operation-dependent temporary data structure that will be used by the routine that effectuates the operation. The second routine (the operation routine) is a thread unaware routine that uses the operation-dependent temporary data structure to effectuate the operation on the problem domain. The third routine performs post-processing operations. These post-processing operations include deleting the operation-dependent temporary data structure and (in the case of a partitioned problem domain and as needed) of consolidating the results generated by each thread to provide a complete result of the operation on the problem domain.

Figure 3:
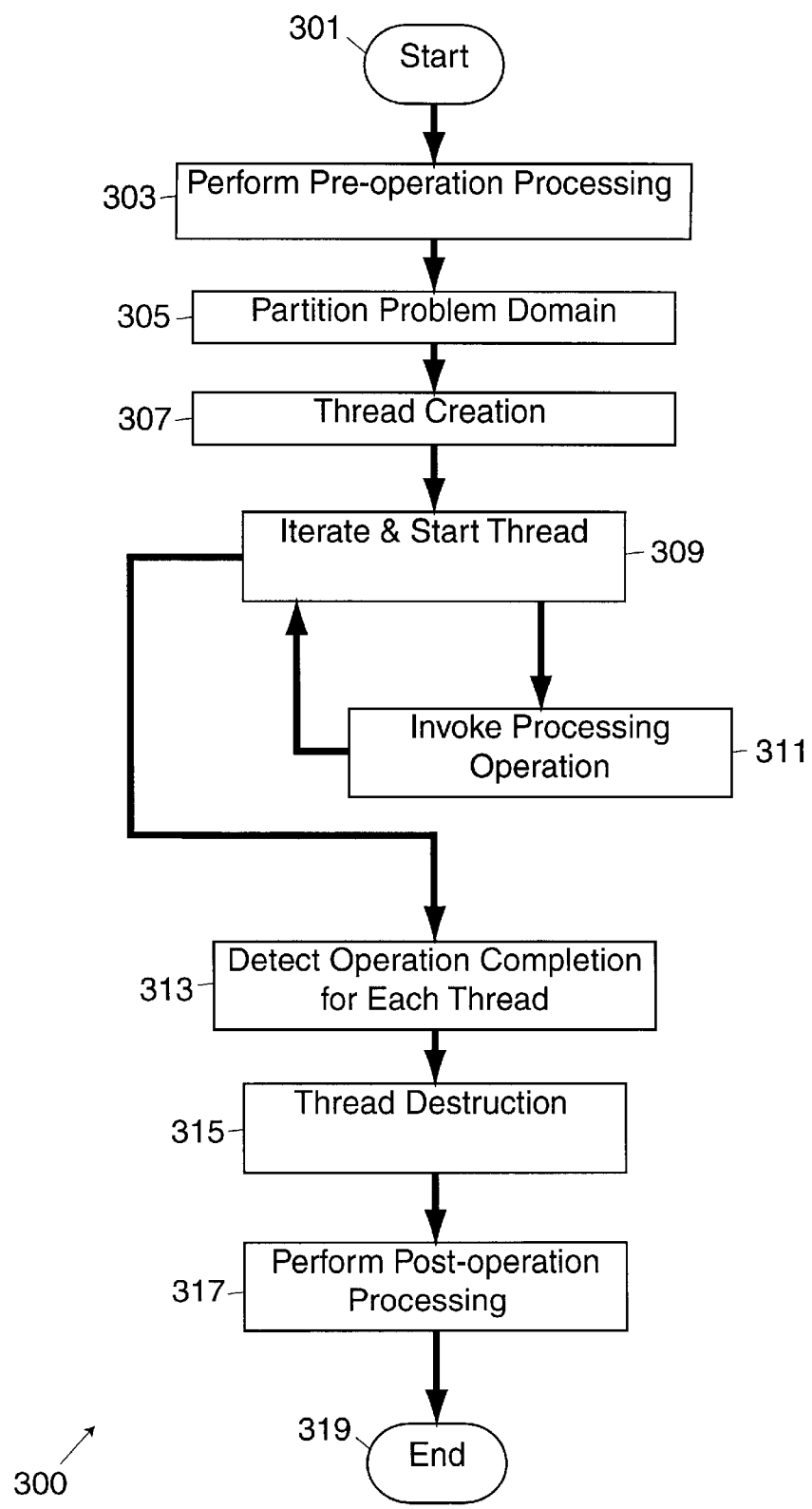
FIG. 3 illustrates a 'thread execution' process for the execution of a thread-unaware operation, that accesses an operation-dependent temporary data structure, to process a partitioned problem domain in a multi-threaded computing environment in accordance with a preferred embodiment.

FIG. 3 illustrates a 'thread execution' process, indicated by general reference character 300, used to invoke the three previously mentioned routines. The process 300 invokes a thread-unaware routine that accesses an operation-dependent temporary data structure to perform an operation. The process 300 initiates at a 'start' terminal 301 and continues to a 'perform pre-operation processing' procedure 303 that initializes the operation-dependent temporary data structure that will be used by the thread-unaware routine and returns a pointer (or equivalent) to the operation-dependent temporary data structure. The 'perform pre-operation processing' procedure 303 is subsequently described with respect to FIG. 4.

The process 300 continues to a 'partition problem domain' procedure 305. The 'partition problem domain' procedure 305 partitions the total problem domain into a plurality of sub-domains. Then, process 300 creates a plurality of threads for processing the problem sub-domains at a 'thread creation' procedure 307. Each thread is assigned a problem sub-domain for processing. For example, where the problem domain is an image, the image data may be divided into sub-domains representing image tiles. Each tile is then processed by a thread. One skilled in the art will recognize many problems (other than image processing problems) also may be addressed by partitioning the problem into a plurality of sub-problems. One skilled in the art will also understand that the order of processing for the 'partition problem domain' procedure 305 and the 'thread creation' procedure 307 can be reversed if an internal variable is used to determine whether the shared data structure is already initialized.

The process 300 next performs an 'iterate and start thread' procedure 309 that starts the threads created by the 'thread creation' procedure 307. An 'invoke processing operation' procedure 311 is executed by each of the threads started by the 'iterate and start thread' procedure 309. The 'invoke processing operation' procedure 311 invokes the thread-unaware operation routine (per each thread) that implements a processing operation and passes the pointer to the operation-dependent temporary data structure and information identifying the problem domain partition assigned to the thread. Note that the threads are created (by the 'thread creation' procedure 307) and started (by the 'iterate and start thread' procedure 309) outside of the operation routine that effectuates the processing operation. Thus, the operation routine is thread-unaware as it does not contain programmed logic to manage or manipulate threads. When the operation routine is invoked (from each thread) it receives a partition of the problem domain, accesses the operation-dependent temporary data structure (identified by the passed pointer) as necessary to complete processing of the problem partition, and returns any results. One skilled in the art will recognize that the problem domain is distinct from the operation-dependent temporary data structure. One skilled in the art will also recognize that the problem domain includes any collection of data capable of being processed, or a computational task capable of being performed, in a multi-threaded computing environment.

Next the process 300 performs a 'detect operation completion on each thread' procedure 313 that awaits the completion of the threads started by the 'iterate and start thread' procedure 309. Note that since the process 300 can detect completion in this manner, the operation routine need not keep track of the number of threads used to parallelize execution of the operation in order to detect completion. The process 300 next invokes a 'thread destruction' procedure 315 that releases the threads created by the 'thread creation' procedure 307. The process 300 then invokes a 'perform post-operation processing' procedure 317 (subsequently described with respect to FIG. 5) and completes through an 'end' terminal 319. One skilled in the art will recognize equivalent orderings of the procedures illustrated in FIG. 3; the invention is not limited to the illustrated ordering, but rather also encompasses its equivalents. In addition, one skilled in the art will understand that the process 300 can be invoked by multiple threads processing different problem domains. One skilled in the art will also understand that process 300 can also be invoked by separate threads that perform the same operation using different operation-dependent temporary data structures. That is, the process 300 also can be invoked from a number of separately scheduled operations.

Figure 4:
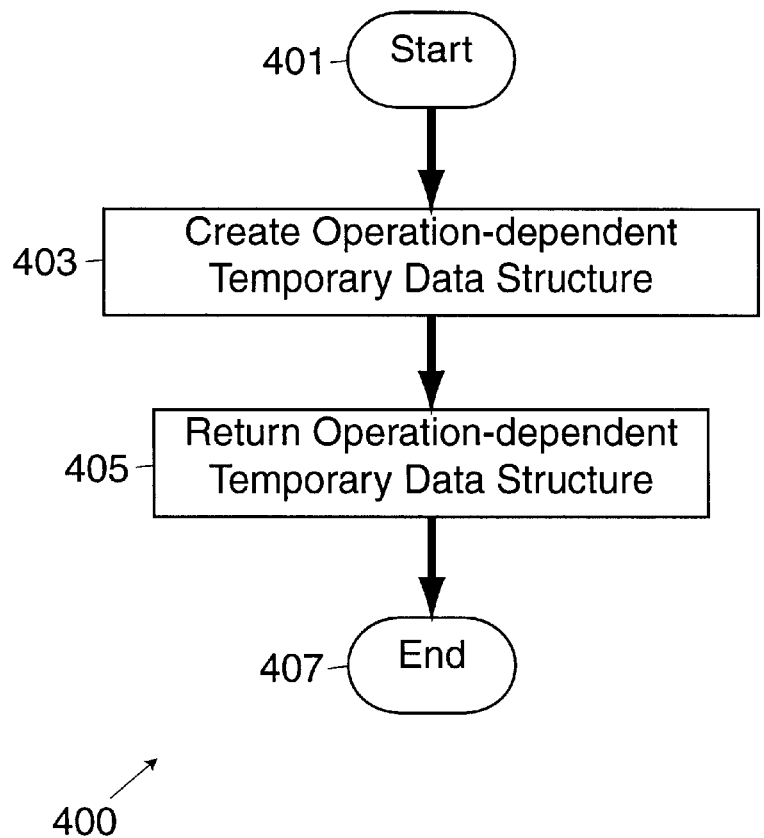
FIG. 4 illustrates a pre-operation process used in accordance with a preferred embodiment.

FIG. 4 illustrates a pre-operation process, indicated by general reference character 400. The 'perform pre-operation processing' procedure 303 invokes the process 400 which initiates at a 'start' terminal 401. The process 400 continues to a 'create operation-dependent temporary data structure' procedure 403 that allocates and initializes an operation-dependent temporary data structure. The data structure may be initialized to optimize a performance aspect of the procedure implementing the processing operation invoked by the 'invoke processing operation' procedure 311. For example, it may be expanded for more rapid processing. One skilled in the art will understand that there are numerous other uses for a temporary data structure and that these uses depend on the operations performed by the operation routine. The 'create operation-dependent temporary data structure' procedure 403 obtains a pointer (or equivalent) to the operation-dependent temporary data structure. The 'create operation-dependent temporary data structure' procedure 403 is generally provided by the programmer who provided the thread-unaware operation routine.

After the 'create operation-dependent temporary data structure' procedure 403 completes the process 400 continues to a 'return operation-dependent temporary data structure' procedure 405. The 'return operation-dependent temporary data structure' procedure 405 returns the pointer (or equivalent) to the operation-dependent temporary data structure created by the procedure 403. The process 400 then completes through an 'end' terminal 407. One skilled in the art will recognize that the operation-dependent temporary data structure includes any data structure accessed by a routine that implements a processing operation.

Figure 5:
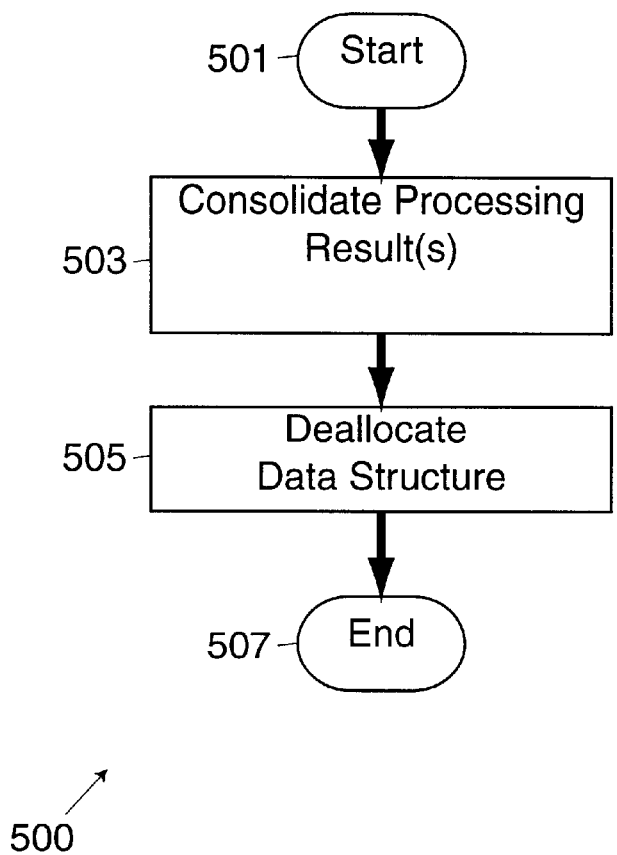
FIG. 5 illustrates a 'post-operation process' in accordance with a preferred embodiment.

FIG. 5 illustrates a 'post-operation process', indicated by general reference character 500. The process 500 initiates at a 'start' terminal 501 and continues to a 'consolidate processing results' operation routine 503. If the routines invoked by the 'invoke processing operation' procedure 311 return results that accumulate over the problem domain, the 'consolidate processing results' operation routine 503 consolidates these results. One skilled in the art will recognize that not all processing operations will require consolidation; irrespective of whether consolidation occurs, the process 500 proceeds to a 'deallocate data structure' operation routine 505. This routine releases (deallocates or dereferences) the operation-dependent temporary data structure created by the 'create operation-dependent temporary data structure' procedure 403. The process 500 then completes through an 'end' terminal 507.

From the foregoing, it will be appreciated that the invention has (without limitation) the following advantages:

1) The invention simplifies the programming of a routine that accesses a operation-dependent temporary data structure and performs an operation for multiple threads.
2) The invention improves the efficiency of a routine that accesses a operation-dependent temporary data structure and is used by multiple threads by removing the thread management operations from the routine to make the routine thread-unaware.
3) The invention also discloses an architecture for managing threaded operations wherein the architecture is not limited by the capabilities of the operation routine because the operation routine is thread-unaware.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method comprising:
   (a) invoking a thread unaware operation routine, that implements an operation that accesses an operation-dependent temporary data structure from within a multi-threaded computing environment, said thread unaware operation routine executed by a plurality of threads;
   (b) invoking a pre-process routine separate from said thread unaware operation routine that prepares said operation-dependent temporary data structure for access by said thread unaware operation routine; and
   (c) invoking said thread unaware operation routine by one or more of said plurality of threads to perform said thread unaware operation routine using said operation-dependent temporary data structure allocated by said pre-process routine;
   (d) invoking a post-process routine separate form said thread unaware operation routine and said pre-process routine to return consolidated results from said operation-dependent temporary data structure.

2. The computer controlled method of claim 1 wherein said plurality of threads are scheduled to execute simultaneously to collectively process a problem domain.

3. The computer controlled method of claim 1 wherein said plurality of threads result from a plurality of separate scheduled operations and invocations of said thread unaware operation routine from a first of said plurality of threads uses a first operation-dependent temporary data structure and invocation of said thread unaware operation routine from a second of said plurality of threads uses a second operation-dependant temporary data structure.

4. The computer controlled method of claim 3 wherein said second operation-dependent temporary data structure is said first operation-dependent temporary data structure.

5. The computer controlled method of claim 1 wherein step (d) further comprises:
   deallocating said operation-dependent temporary data structure after completion of all of said plurality of threads.

6. The computer controlled method of claim 1 further comprising steps of:
   (e) partitioning said operation-dependent temporary data structure into a plurality of data structure partitions; and
   (f) assigning one of said plurality of data structure partitions to one of said plurality of threads for processing by said thread unaware operation routine.

7. An apparatus having a central processing unit (CPU) and a memory coupled to said CPU said apparatus comprising:
- (g) a thread unaware operation invocation mechanism configured to invoke an operation routine, that implements an operation that accesses an operation-dependent temporary data structure from within a multi-threaded computing environment, said operation routine executed by a plurality of threads;
- (h) a pre-process invocation mechanism configured to invoke a pre-process routine separate from said thread unaware operation routine that prepares said operation-dependent temporary data structure for access by said thread unaware operation routine; and
- (i) an operation invocation mechanism configured to invoke said thread unaware operation routine by one or more of said plurality of threads to perform said thread unaware operation routine using said operation-dependent temporary data structure allocated by the pre-process invocation mechanisms;
- (j) a post-process invocation mechanism configured to invoke a post-process routine separate from said thread unaware operation routine and said pre-process routine to further comprise a result consolidation mechanism configured to return consolidated results from said operation-dependent temporary data structures.

8. The apparatus of claim 7 wherein said plurality of threads are scheduled to execute simultaneously to collectively process a problem domain.

9. The apparatus of claim 7 wherein said plurality of threads result from a plurality of separately scheduled operations and invocation of said thread unaware operation routine from a first of said plurality of threads uses a first operation-dependent temporary data structure and invocation of said thread unaware operation routine from a second of said plurality of threads uses a second operation-dependent temporary data structure.

10. The apparatus of claim 9 wherein said second operation-dependent temporary data structure is said first operation-dependent temporary data structure.

11. The apparatus of claim 7 wherein step (i) further comprises:
- a post-process routine separate from said thread unaware operation routine and said pre-process routine to deallocate said operation-dependent temporary data structure after completion of all of said plurality of threads.

12. The apparatus of claim 7 further comprising:
- (k) a partition mechanism configured to partition said operation-dependent temporary data structure into a plurality of data structure partitions; and
- (l) a partition assignment mechanism configured to assign one of said plurality of data structure partitions to one of said plurality of threads for processing by said thread unaware operation routine.

13. A computer program product comprising:
- (m) a computer usable storage medium having computer readable code embodied therein for causing a computer to invoke an thread unaware operation routine, that implements an operation that accesses an operation-dependent temporary data structure from within a multi-threaded computing environment, said thread unaware operation routine executed by a plurality of threads;
- (n) computer readable program code configured to cause said computer to effect a pre-process invocation mechanism configured to invoke a pre-process routine separate from said thread unaware operation routine that prepares said operation-dependent temporary data structure for access by said thread unaware operation routine; and
- (o) computer readable program code configured to cause said computer to effect an operation invocation mechanism configured to invoke said thread unaware operation routine by one or more of said plurality of threads to perform said thread unaware operation routine using said operation-dependent temporary data structure allocated by the pre-process invocation mechanism.
- (p) computer readable program code configured to cause said computer to effect a post-processing invocation mechanism configured to invoke a post-process routine separate from said thread unaware operation routine and said pre-process routine to further effect a result consolidation mechanism configured to return consolidated results from said operation-dependent temporary data structure.

14. The computer program product of claim 13 wherein said plurality of threads are scheduled to execute simultaneously to collectively process a problem domain.

15. The computer program product of claim 13 wherein said plurality of threads result from a plurality of separately scheduled operations and invocation of said separately scheduled operation routine from a first of said plurality of threads uses a first operation-dependent temporary data structure and invocation of said thread unaware operation routine from a second of said plurality of threads uses a second operation-dependent temporary data structure.

16. The computer program product of claim 15 wherein said second operation-dependent temporary data structure is said first operation-dependent temporary data structure.

17. The computer program product of claim 13 wherein step (p) further comprises:
- a post-process routine to deallocate said operation-dependent temporary data structure after completion of all of said plurality of threads.

18. The computer program product of claim 13 further comprising:
- (q) computer readable program code configured to cause said computer to effect a partition mechanism configured to partition said operation-dependent temporary data structure into a plurality of data structure partitions; and
- (r) computer readable program code configured to cause said computer to effect a partition assignment mechanism configured to assign one of said plurality of data structure partitions to one of said plurality of threads for processing by said thread unaware operation routine.

* * * * *